United States Patent
Nickel (10) Patent No.: US 10,268,624 B2
(45) Date of Patent: Apr. 23, 2019

(54) SUBSCRIBER STATION FOR A BUS SYSTEM AND METHOD FOR IMPROVING THE ERROR TOLERANCE OF A SUBSCRIBER STATION OF A BUS SYSTEM

(71) Applicant: Robert Bosch GmbH, Stuttgart (DE)

(72) Inventor: Patrick Nickel, Birstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/909,348

(22) PCT Filed: Jun. 27, 2014

(86) PCT No.: PCT/EP2014/063653
§ 371 (c)(1),
(2) Date: Feb. 1, 2016

(87) PCT Pub. No.: WO2015/014550
PCT Pub. Date: Feb. 5, 2015

(65) Prior Publication Data
US 2016/0162435 A1 Jun. 9, 2016

(30) Foreign Application Priority Data
Jul. 30, 2013 (DE) .......................... 10 2013 214 870

(51) Int. Cl.
*G06F 13/42* (2006.01)
*H04L 25/02* (2006.01)
(Continued)

(52) U.S. Cl.
CPC ...... *G06F 13/4221* (2013.01); *G06F 11/0745* (2013.01); *G06F 11/0793* (2013.01); *H04L 25/0272* (2013.01); *H04L 2012/40215* (2013.01)

(58) Field of Classification Search
CPC ............. G06F 13/4221; G06F 11/0745; G06F 11/0793; H04L 25/0272; H04L 2012/40215
See application file for complete search history.

(56) References Cited

U.S. PATENT DOCUMENTS 5,027,435 A * 6/1991 Chraplyvy ................ G01J 3/26
398/141
7,580,452 B2 * 8/2009 Lai ........................ H03M 3/374
375/229
(Continued)

FOREIGN PATENT DOCUMENTS

CN 101286963 A 10/2008
DE 4126850 2/1993
(Continued)

OTHER PUBLICATIONS

International Search Report for PCT/EP2014/063653, dated Oct. 9, 2014.
(Continued)

*Primary Examiner* — Henry Tsai
*Assistant Examiner* — John B Roche
(74) *Attorney, Agent, or Firm* — Norton Rose Fulbright US LLP; Gerard Messina (57) ABSTRACT

A subscriber station for a bus system, and a method for improving the error tolerance of a subscriber station of a bus system, are presented. The subscriber station encompasses a transmission/reception device for transmitting a signal via the bus system to a further subscriber station and for receiving a signal via the bus system, in which exclusive, collision-free access by a subscriber station to a bus line of the bus system is guaranteed at least at times; and a modification device for modifying the transmission properties of a transmission path of the transmission/reception
(Continued)

device and/or the reception properties of a reception path of the transmission/reception device.

8 Claims, 10 Drawing Sheets

(51) Int. Cl.
*G06F 11/07* (2006.01)
*H04L 12/40* (2006.01)

(56) References Cited

U.S. PATENT DOCUMENTS

| | | | | |
|---|---|---|---|---|
| 9,162,255 B1* | 10/2015 | Stice | ................... | A61B 8/5207 |
| 2002/0057101 A1* | 5/2002 | Tang | ................... | H04L 25/0286 |
| | | | | 326/29 |
| 2003/0070019 A1* | 4/2003 | Dalakuras | ......... | H04L 12/40156 |
| | | | | 710/110 |
| 2005/0135456 A1* | 6/2005 | Lee | ..................... | G01K 11/006 |
| | | | | 374/117 |
| 2014/0213323 A1* | 7/2014 | Holenarsipur | ....... | H03K 17/955 |
| | | | | 455/566 |

FOREIGN PATENT DOCUMENTS

| | | |
|---|---|---|
| EP | 0643515 | 3/1995 |
| JP | H08265375 A | 10/1996 |
| JP | 2005504446 A | 2/2005 |
| JP | 2011259234 A | 12/2011 |

OTHER PUBLICATIONS

"Can with Flexible Data Rate, Specification Version 1.0" (source: http://www.semiconductors.bosch.de).

* cited by examiner

SUBSCRIBER STATION FOR A BUS SYSTEM AND METHOD FOR IMPROVING THE ERROR TOLERANCE OF A SUBSCRIBER STATION OF A BUS SYSTEM

FIELD OF THE INVENTION

The present invention relates to a subscriber station for a bus system and to a method for improving the error tolerance of a subscriber station of a bus system, in which, in particular, error tolerance in the context of an information transfer on a bus system is improved even in unfavorable conditions such as those that exist, for example, as a result of branches, incorrect terminations, misadaptation, or pinched wiring in the bus system.

BACKGROUND INFORMATION

The CAN bus system has become widespread for communication between sensors and control units. In the CAN bus system, messages are transferred using the CAN protocol as described in the CAN specification in ISO 11898. Techniques such as CAN-FD, in which messages can be transferred in accordance with "CAN with Flexible Data Rate, Specification Version 1.0" (source: http://www.semi-conductors/bosch.de), etc., have also recently been proposed for this. With such technologies, the maximum possible data rate is increased beyond a value of 1 Mbit/s by using faster cycle timing in the area of the data fields. This can generally be detrimental to transfer quality, for example in the form of a higher bit error rate, when actually existing bus topologies are taken as the basis.

Actually existing bus topologies usually deviate from theory in that reflections occur on the bus line at points at which the bus line exhibits a characteristic impedance deviating from theory. Such points are, for example, branches, incorrect terminations, misadaptation, or pinched wiring, which are often encountered in practical implementations, for example, with stub lines, passive neutral points, etc. The reflections occurring as a result lead to time-related crosstalk of states on the bus line, in such a way that a transmitted symbol or bit "talks over" the symbols following in time, and can distort the sensing thereof.

According to the CAN specification in ISO 11898, the bus line should be terminated at both ends with the line impedance, so that the transient phenomena for the specified maximum cable length decay within a transmitted symbol and an unequivocal state exists at the end of the symbol interval. In reality, however, crosstalk between two or more CAN symbols is unavoidable.

A subscriber station of a CAN bus system is made up of a communication processor that usually is integrated into a microcontroller, and a transmitter/receiver that is also called a "transceiver" and is usually embodied as a separate chip having a direct connection to the bus line. In a transceiver of this kind, the reception path usually encompasses only a comparator preceded by voltage dividers for bias adaptation of the bus level. The comparator directly evaluates the bus level of dominant and recessive bit states and produces a decision at the output.

The transmission path is made up of a respective pull up and pull down transistor for the two bus wires of the CAN bus system, which are also called CAN High (C_H) and CAN Low (C_L) and are used to couple in the dominant level in the transmission state. The recessive levels occur when both transistors are not switched, so that the input resistance of the reception path pulls the levels of the two bus wires of the bus line to an average level. Arbitration of multiple subscriber stations of the bus system can be carried out as a result of different internal resistance levels in the dominant and the recessive state.

The transmission level is established by the switching operations described above. A charge reversal process takes place here because of the predominantly capacitive properties of the bus line of the bus system, with the result that the desired bus level becomes established only after a certain time. The transition from dominant level to recessive level and from recessive level to dominant level takes place at different speeds or time constants.

These different times result in higher error probabilities in the receiving device, which can also be called a "receiver," because of the slower transition from dominant to recessive bus level. Because an increase in the data rate is achieved in CAN-FD in particular by shortening the symbol duration in the data section, which is transmitted once arbitration is complete, this property could limit the utilization scenarios for the bus system.

The distance between the received signal and the decider threshold is very greatly decreased in this context, so that overlaid noise interference can, with a very much higher probability, result in an incorrect detection in the CAN transmission/reception device.

SUMMARY

It is therefore an object of the present invention to furnish a subscriber station for a bus system, and a method, which solve the problems recited above. The intention in particular is to furnish a subscriber station for a bus system, and a method, in which the transmission quality for an information transfer on a bus system, which in particular is a CAN bus system, is improved even in the aforesaid unfavorable conditions of a real bus line.

The object is achieved by a subscriber station for a bus system. The subscriber station encompasses a transmission/reception device for transmitting a signal via the bus system to a further subscriber station and for receiving a signal via the bus system, in which exclusive, collision-free access by a subscriber station to a bus line of the bus system is guaranteed at least at times; and a modification device for modifying the transmission properties of a transmission path of the transmission/reception device and/or the reception properties of a reception path of the transmission/reception device.

An improvement in the signal on the bus line is achieved with the subscriber station by way of additional actions in the transmission/reception device.

The subscriber station offers a great advantage for the transition from dominant to recessive states, which also applies to CAN and optionally also to FlexRay. The subscriber station is especially suitable for the problem with higher switching speeds in the data section of CAN-FD.

The subscriber station is thus also suitable for use in faster-cycle systems, for example CAN-FD. In an embodiment, the functionality of the subscriber station with regard to the signal to be transmitted and/or the received signal can also be implemented in particular as pre-processing in a transmission/reception device or transceiver, or in a CAN transceiver, or in a transceiver chipset, or in a CAN transceiver chipset. It is possible in particular for the functionality in question to be embedded either in the transceiver as a separate electronic module (chip), or in an integrated overall solution in which only one electronic module (chip) is present.

The subscriber station is suitable for improving transmission quality in the context of information transfer on a CAN bus system even in the aforesaid unfavorable conditions of an actual or real bus topology. The subscriber station is also suitable for use in systems having faster cycles than a standard CAN bus system, and can be realized in an implementation in the transmission path and/or reception path of a transceiver, in particular of a CAN transceiver chipset. The subscriber station has for this purpose an additional processing stage as compared with presently available solutions.

The modification device can encompass a transmitter output stage for pre-distortion of the signal to be transmitted by the transmission/reception device, in order to achieve equilibration of the bus level on a transmission channel within one cycle of the signal to be transmitted; and/or the modification device can be a receiver modification device for changing the detection point in time to the right in the eye diagram and the decider threshold upward in the eye diagram.

The transmitter output stage can be configured, for pre-distortion of the signal to be transmitted by the transmission/reception device, in such a way that it adapts the transmitter properties of the subscriber station as a function of the portion of a frame of the bus system. The transmitter output stage can be configured for pre-distortion of the data portion of the signal to be transmitted by the transmission/reception device.

Possibly, the transmitter output stage is configured, for pre-distortion of the signal to be transmitted by the transmission/reception device, in such a way that it modifies the voltage level of the signal to be transmitted or the output resistance of the transmission/reception device. The transmitter output stage can be configured in such a way that it adapts both the voltage level and the output resistance as a function of the time following a change in the state of the transmission signal. The change in the state of the transmission signal can moreover be, in particular, a change from a dominant to a recessive state of the transmission signal.

Preferably the transmitter output stage encompasses a first transistor that is controllable by a first control application signal, a second transistor that is controllable by a second control application signal, a third transistor that is controllable by a third control application signal, and a fourth transistor that is controllable by a fourth control application signal, the first and the second transistor being connected to a terminal for a first bus wire, and the third and the fourth transistor being connected to a terminal for a second bus wire. The transmitter output stage can be configured in such a way that it respectively applies control linearly to the first to fourth transistors, in order to establish for the first and the second bus wire a level having a defined internal resistance. Alternatively or additionally, the transmitter output stage can be configured in such a way that it uses, within each bit state, predetermined time profiles for the first to fourth control application signals in order to pre-distort the signal to be transmitted and the impedance of a transmission path of the transmission/reception device.

The subscriber station described above can be part of a bus system that has a bus line and at least two subscriber stations that are connected to one another via the bus line in such a way that they can communicate with one another. At least one of the at least two subscriber stations is a subscriber station described above.

The object recited above is furthermore achieved by a method for improving the error tolerance of a subscriber station of a bus system. The method encompasses the steps of: transmitting, with a transmission/reception device of the subscriber station, a signal via the bus system to a further subscriber station, or receiving, with the transmission/reception device of the subscriber station, a signal via the bus system, in which exclusive, collision-free access by a subscriber station to a bus line of the bus system is guaranteed at least at times; and pre-distorting, with a transmitter output stage of the subscriber station, the signal to be transmitted by the transmission/reception device, in order to achieve equilibration of the bus level on a transmission channel within the clock cycle of the signal to be transmitted.

The method offers the same advantages recited previously with regard to the subscriber station.

Further possible implementations of the invention also encompass combinations, not explicitly recited, of features or embodiments described previously or hereinafter with regard to the exemplifying embodiments. One skilled in the art will also add individual aspects as improvements or additions to the respective basic form of the invention.

DETAILED DESCRIPTION

Unless otherwise indicated, identical or functionally identical elements are labeled in the Figures with the same reference characters.

Description Of The Exemplifying Embodiments

Figure 1:
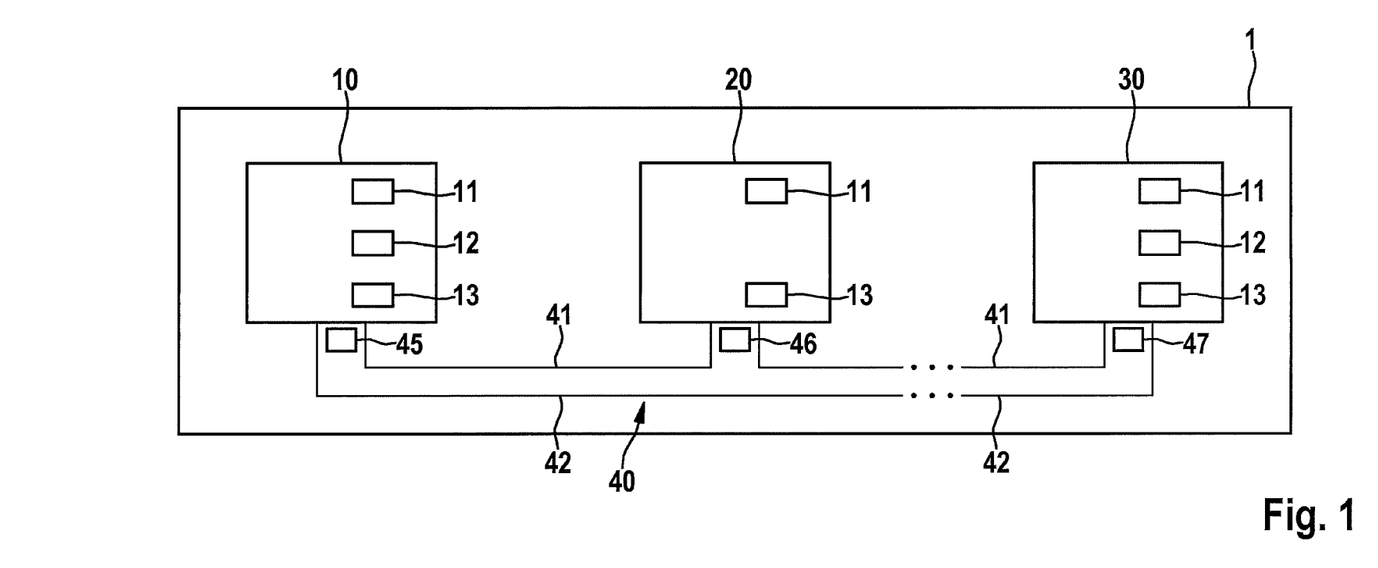
FIG. 1 is a simplified block diagram of a bus system according to a first exemplifying embodiment.

FIG. 1 shows a bus system 1 that can be, for example, a CAN bus system, a CAN-FD bus system, etc. Bus system 1 can be utilized in a vehicle, in particular a motor vehicle, an aircraft, etc., or in a hospital, etc.

In FIG. 1, bus system 1 has a plurality of subscriber stations 10, 20, 30 that are each connected to a bus line 40 having a first bus wire 41 and a second bus wire 42. Bus wires 41, 42 can also be called CAN High (C_H) and CAN Low (C_L) and serve to couple in the dominant level in the transmission state. Messages 45, 46, 47 in the form of signals can be transferred via bus line 40 between the individual subscriber stations 10, 20, 30. Subscriber stations 10, 20, 30 can be, for example, control units or indicating apparatuses of a motor vehicle.

As shown in FIG. 1, subscriber stations 10, 30 each have a communication control device 11, a receiver modification device 12, and a transmission/reception device 13. Subscriber station 20, conversely, has a communication control device 11 and a transmission/reception device 13. Transmission/reception devices 13 of subscriber stations 10, 20, 30 are each connected directly to bus line 40, although this is not depicted in FIG. 1.

Communication control device 11 serves to control a communication of the respective subscriber stations 10, 20, 30 via bus line 40 with another subscriber station of subscriber stations 10, 20, 30 connected to bus line 40. Receiver modification device 12 serves to improve the reception quality of message 45, 46, 47 received by transmission/reception device 13, as will be described later in more detail. Communication control device 11 can be embodied like a conventional CAN controller. Transmission/reception device 13 can be embodied in terms of its transmission functionality like a conventional CAN transceiver.

Figure 2:
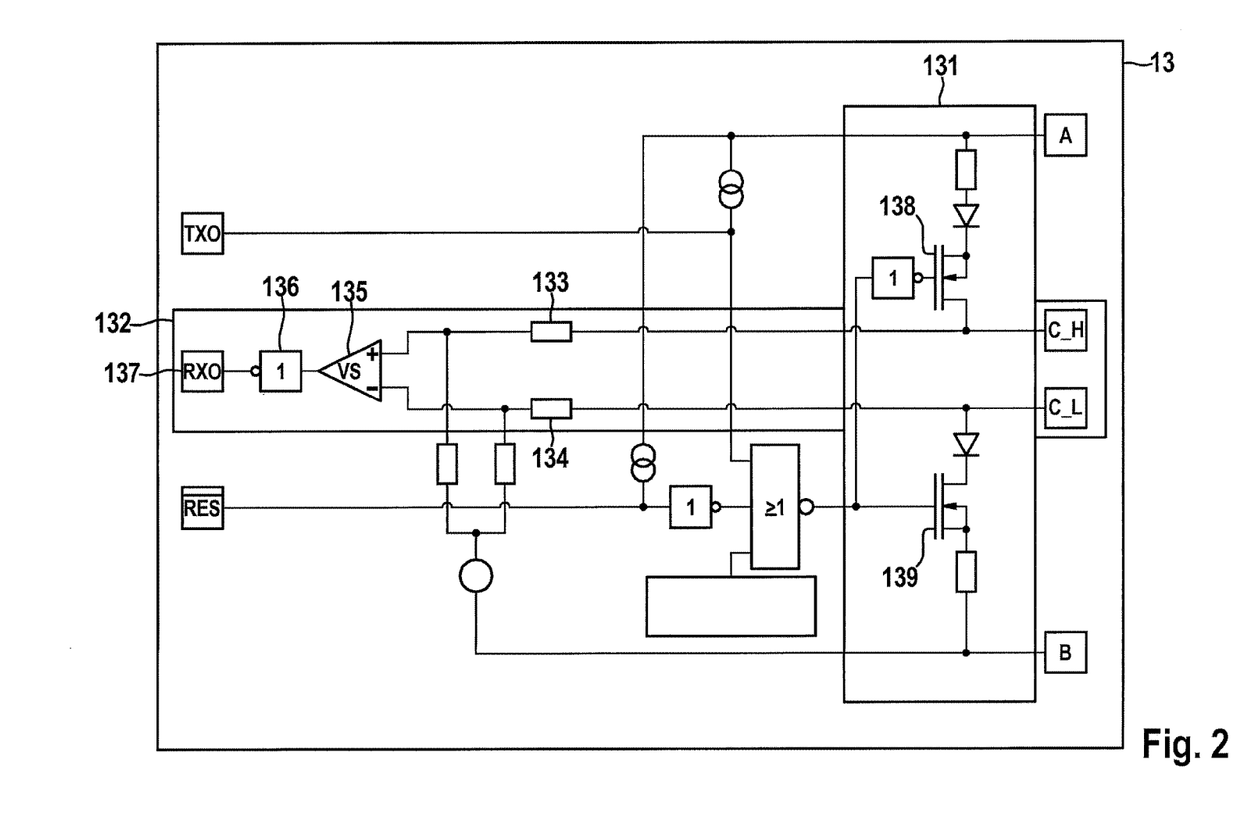
FIG. 2 is an electrical circuit diagram of a transmission/reception device of the bus system according to the first exemplifying embodiment.

FIG. 2 shows in more detail, as an example, the construction of a transmission/reception device 13 of subscriber station 20. Transmission/reception device 13 has a transmission path 131 and a reception path 132. Transmission path 131 serves for transmission of a signal to be transmitted, which is based on one of messages 45, 46, 47. Reception path 132 serves for reception of the corresponding transmitted signal. Transmission path 131 and reception path 132 are each constructed as in a conventional CAN subscriber station.

In FIG. 2, transmission/reception device 13 has in reception path 132 a first and a second input terminal C_H, C_L for connection to bus wires 41, 42. Also disposed in reception path 132 are two resistors 133, 134, a comparator 135, a processing member 136, and an output terminal 137. Resistor 133 is disposed between a first input of comparator 135, which input is at positive potential, and first input terminal C_H. Resistor 134 is disposed between a second input of comparator 135, which input is at negative potential, and second input terminal C_L. A pull up transistor 138 and a pull down transistor 139 for the two bus wires 41, 42 are disposed in transmission path 131.

Figure 3:
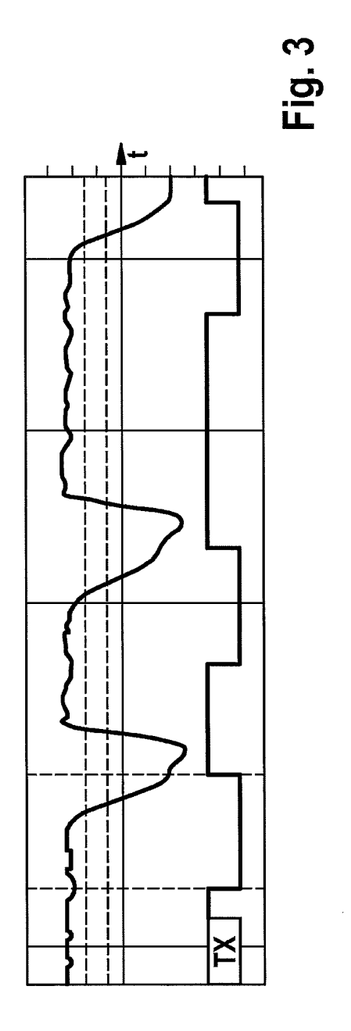
FIG. 3 shows a signal profile of a transmitted signal that is transferred via the bus system according to the first exemplifying embodiment, and a signal profile of an associated control application signal TX.

FIG. 3 shows two signal profiles over time that occur in a subscriber station 20. The upper part of FIG. 3 shows an example of a measured difference signal C_L–C_H between bus wires 41, 42 of bus line 40. The lower part of FIG. 3 shows the control signal TX, associated therewith, for transmission path 131. Especially evident in the measured difference signal C_L–C_H, in addition to the switching delay, are the different time constants with which the desired bus level becomes established. The transitions from dominant level to recessive level and from recessive to dominant level therefore take place with different speeds or time constants. The reason for this is that the output resistance of CAN transmission/reception device 13 depends on the transmission state of the signal that is to be transmitted or that has been transmitted.

Figure 4:
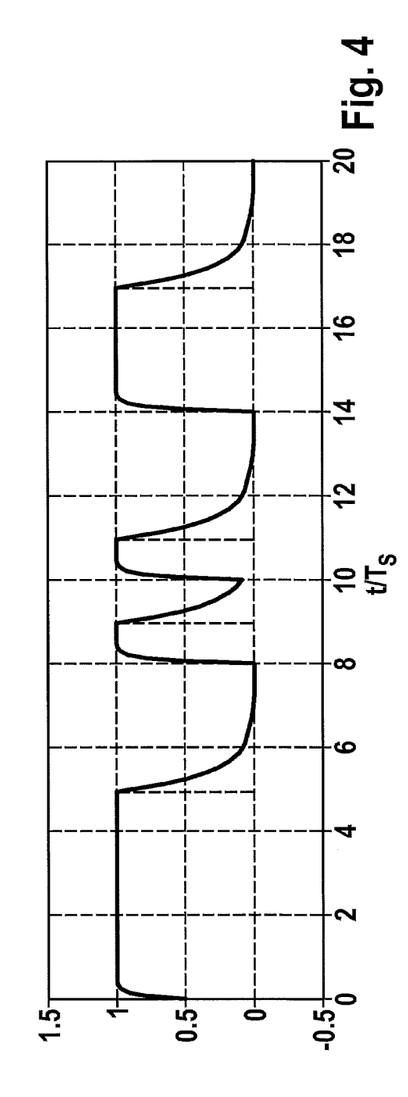
FIG. 4 shows an idealized (normalized) signal profile having an exponentially decreasing characteristic of the output stage of the transmission/reception device of FIG. 2 and of a bus line of the bus system.

FIG. 4 shows an idealized signal profile with an exponentially decreasing characteristic of transmission/reception device 13 and of bus line 40, plotted against time and normalized to the cycle time $T_s$ of the signal to be transmitted or the transmission signal.

Figure 5:
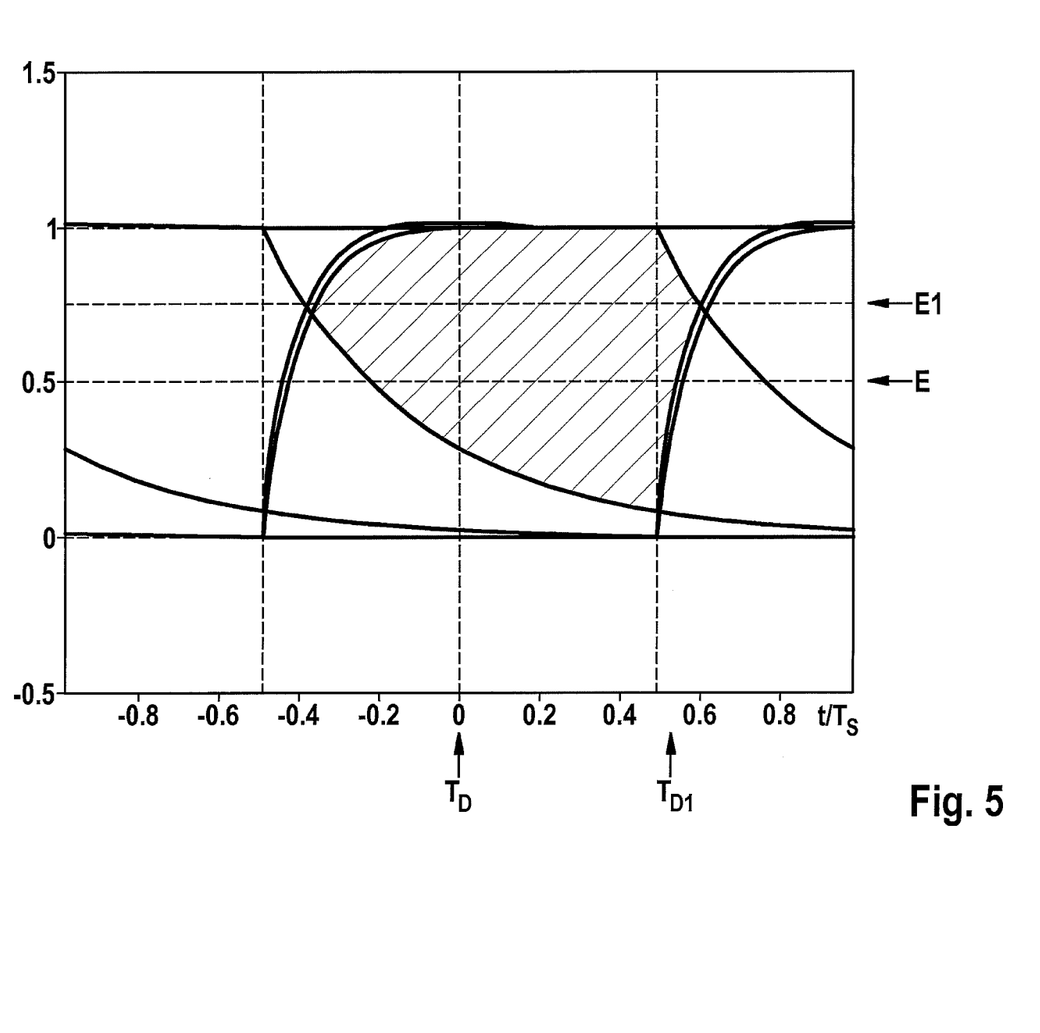
FIG. 5 shows an example of an eye diagram corresponding to the signal profile of FIG. 4.

It is evident from the eye diagram of FIG. 5 that the distance of the received signal from the decider threshold E, which in FIG. 5 is located at the center of the vertical axis at 0.5, is very greatly decreased. The result is that noise interference that is overlaid on the signal transmitted via bus line 40 can lead, with very much higher probability, to an incorrect detection. The region usable for detection is depicted with hatching in the diagram in FIG. 5.

In order to achieve optimum error tolerance, receiver modification device 12 modifies the receiving properties of transmission/receiving device 13. This is depicted in FIG. 5 and will be explained in connection with the method shown in FIG. 6 for improving the error tolerance of a subscriber station 10, 30.

Figure 6:
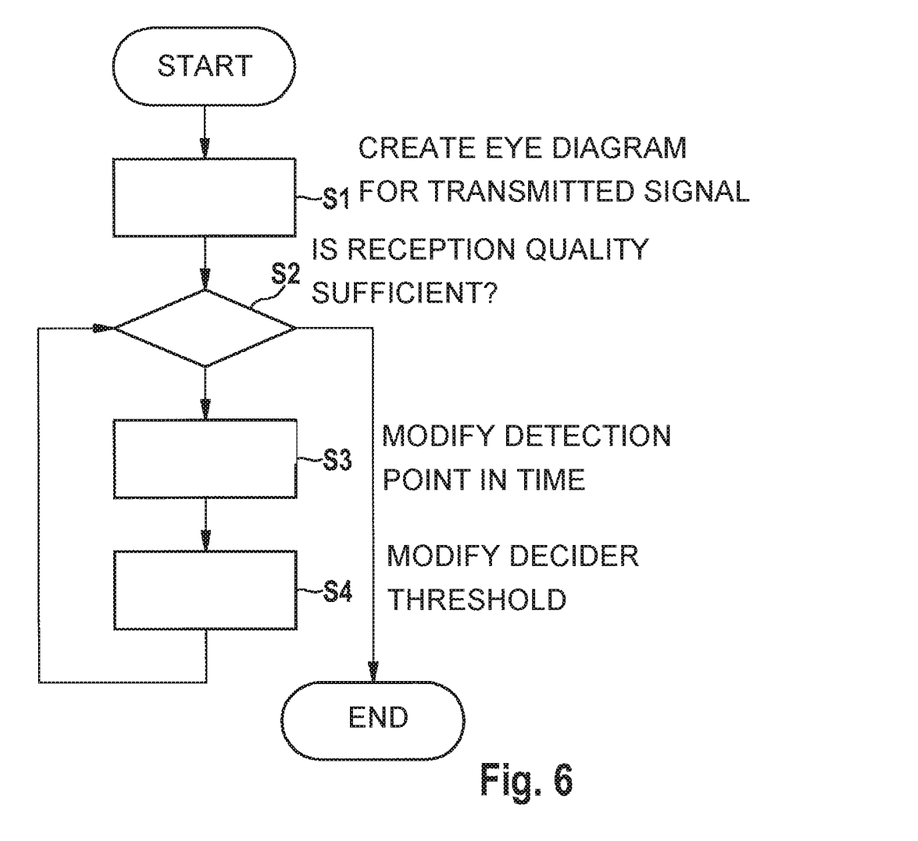
FIG. 6 is a flow chart of a method according to the first exemplifying embodiment.

In FIG. 6, after the method begins in a step S1, the eye diagram for the transmitted signal is created.

A subsequent step S2 determines whether or not the reception quality of transmission/reception device 13 is sufficient. If the response at step S2 is Yes, the method ends. If the response at step S2 is No, on the other hand, execution proceeds to a step S3.

In step S3, the detection point in time $T_D$ in FIG. 5 is modified by receiver modification device 12 in such a way that it is located as far as possible to the right in the hatched region of the eye diagram of FIG. 5. In the case shown in FIG. 5, the detection point in time $T_{D1}$ thereby modified is located slightly below 0.6 on the horizontal axis. Execution then proceeds to a step S4.

In step S4, receiver modification device 12 modifies the decider threshold E in FIG. 5 by the fact that receiver modification device 12 lifts the decider threshold E slightly upward to the modified decider threshold E1 in FIG. 5. In the case shown in FIG. 5, the modified decider threshold E1 is located at approximately 0.7 on the vertical axis. The method then goes back to step S2.

In other words, receiver modification device 12 displaces the detection point in time $T_D$ to the right to the modified detection point in time $T_{D1}$, and lifts the decider threshold E slightly upward to the modified decider threshold E1. Alternatively, step S3 can also be carried out after step S4 or together with it. Alternatively, only step S3 or step S4 can also be carried out.

With receiver modification device 12 it is consequently possible to prevent these different times from resulting in higher error probabilities in reception path 132, caused by the slower transition from dominant to recessive bus level. With the two subscriber stations 10, 30 the quality of the signal, based on one of messages 45, 46, 47, received by their transmission/reception device 13 can be improved, and thus the error tolerance of subscriber stations 10, 30 can be improved.

Figure 7:
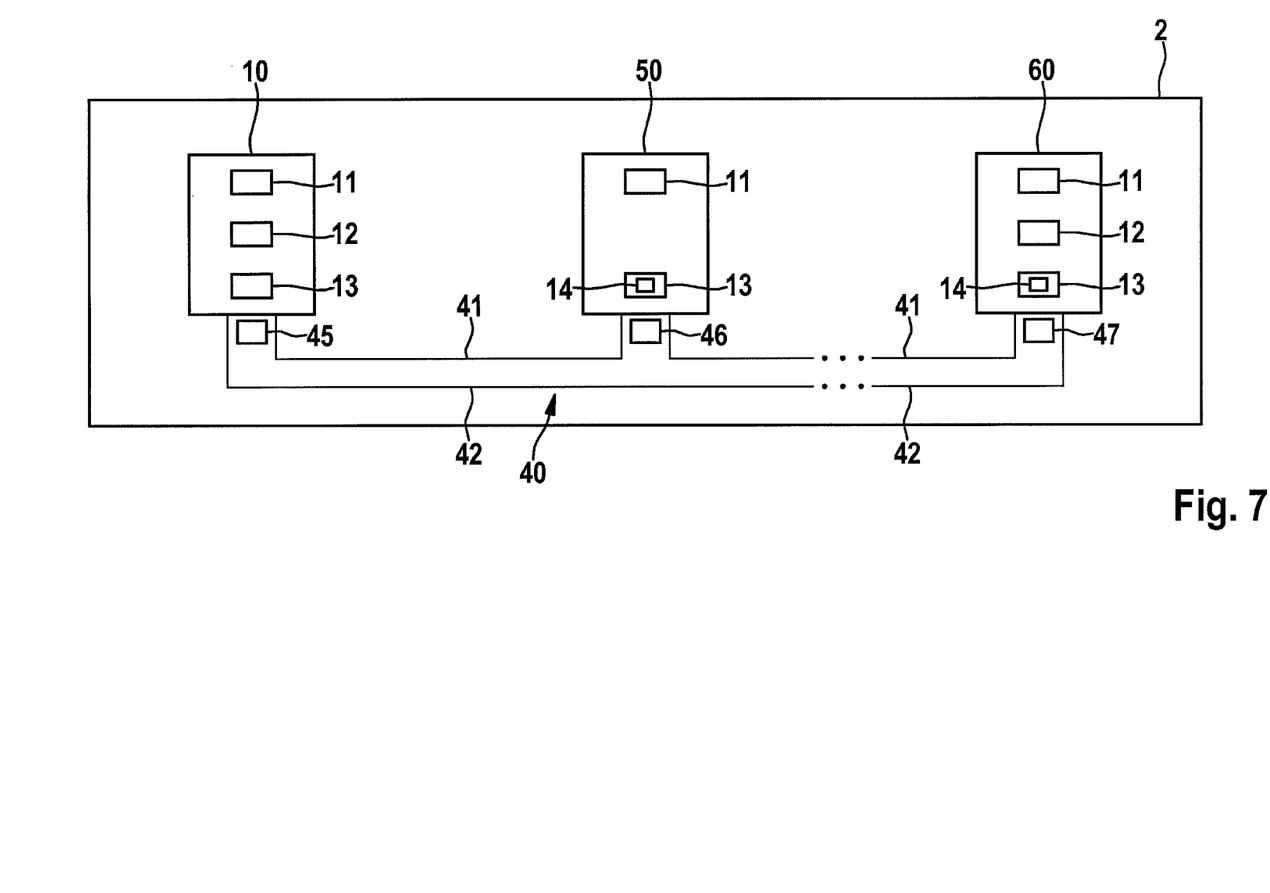
FIG. 7 is a simplified block diagram of a bus system according to a second exemplifying embodiment.

FIG. 7 shows a bus system 2 according to a second exemplifying embodiment. Bus system 2 encompasses, besides at least one subscriber station 10 that is constructed as in the first exemplifying embodiment, at least one subscriber station 50 and at least one subscriber station 60. Subscriber stations 10, 50, 60 are each connected to bus line 40, as in the first exemplifying embodiment. As in the first exemplifying embodiment, messages 45, 46, 47 in the form of signals can be transferred via bus line 40 between the individual subscriber stations 10, 50, 60. Subscriber stations 50, 60 as well can be, for example, control units or indicating apparatuses of a motor vehicle, etc.

Subscriber stations 50, 60 each have, besides communication device 11 and transmission/reception device 13, a transmitter modification device 14. Subscriber stations 10, 60 moreover each have a receiver modification device 12, whereas subscriber station 50 does not have a receiver modification device 12. Receiver modification device 12 is constructed in the same manner as described in the context of the first exemplifying embodiment.

Figure 8:
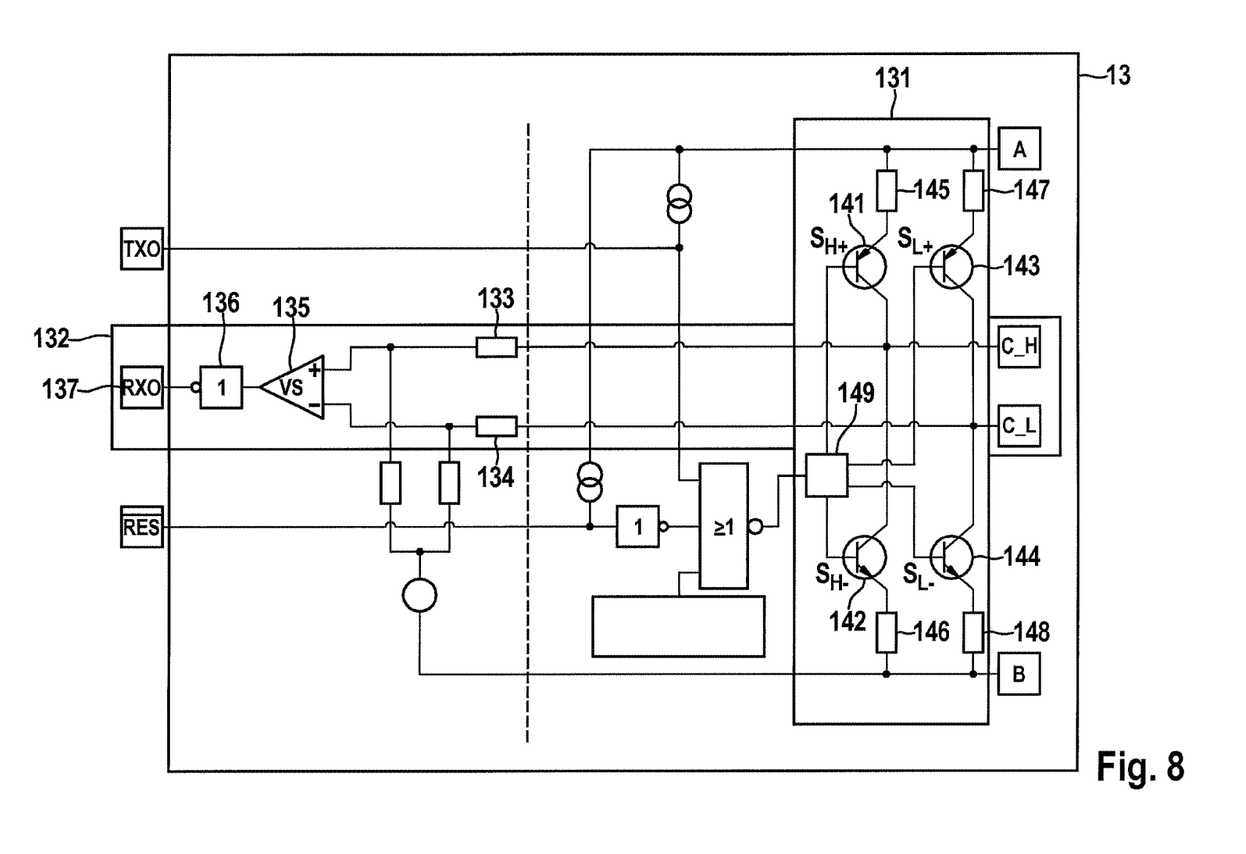
FIG. 8 is an electrical circuit diagram of a transmission/reception device of the bus system according to the second exemplifying embodiment.

FIG. 8 shows in more detail, as an example, the construction of a transmission/reception device 13 of subscriber station 50. Transmission/reception device 13 again has a transmission path 131 and a reception path 132, reception path 132 being constructed as in the first exemplifying embodiment. In this exemplifying embodiment, however, transmission path 131 has a first transistor 141 that is controlled by a control application $S_{H+}$, a second transistor 142 that is controlled by a control application signal $S_{H-}$, a third transistor 143 that is controlled by a control application signal $S_{L+}$, and a fourth transistor 144 that is controlled by a control application signal $S_{L-}$. First transistor 141 is connected via a resistor 145 to a terminal A. Second transistor 142 is connected via a resistor 146 to a terminal B. Third transistor 143 is connected via a resistor 147 to terminal A. Fourth transistor 144 is connected via a resistor 148 to terminal B. In addition, first and second transistors 141, 142 are connected to a terminal C_H for first bus wire 41 of bus line 40. Third and fourth transistors 143, 144 are connected to a terminal C_L for second bus wire 42 of bus line 40. A logic module 149 connects transmission path 131 to further components (not described here in detail) of transmission/reception device 13.

Figure 9:
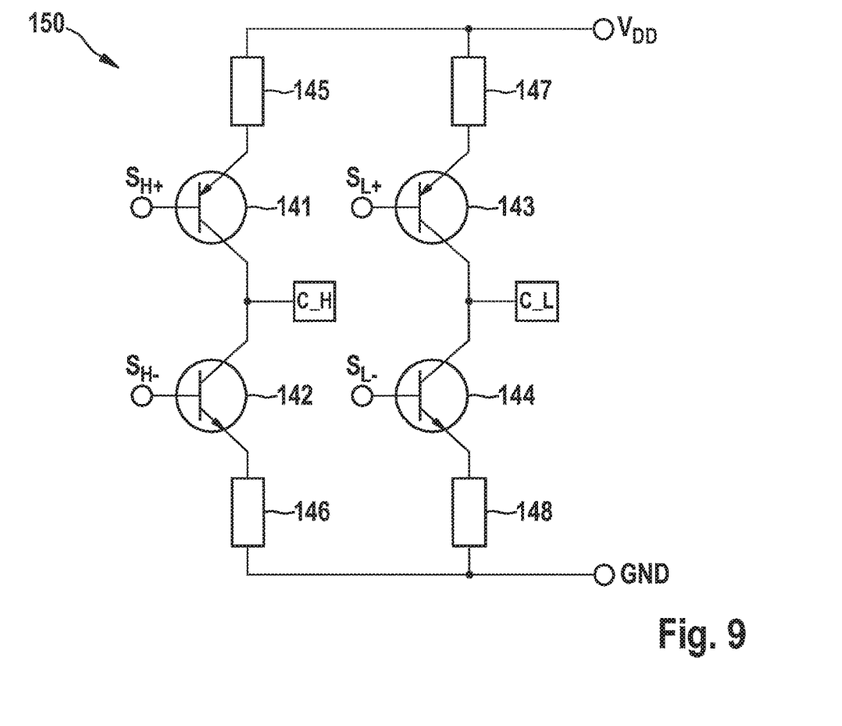
FIG. 9 is an electrical circuit diagram of a transmitter output stage of the transmission/reception device of the bus system according to the second exemplifying embodiment.

In transmission/reception device 13, transistors 141 to 144 and resistors 145 to 148 form a transmitter output stage 150 that is also depicted separately in FIG. 9. In FIG. 9, terminal A is labeled with the voltage VDD, and terminal B with ground GND. Transmitter output stage 150 serves to modify a signal to be transmitted, as shown e.g. in FIG. 4 with reference to the first exemplifying embodiment.

Transmitter output stage 150 is configured for this in such a way that it pre-distorts the signal to be transmitted, which can also be called a "transmission signal," in order to achieve faster equilibration of the desired bus level on bus line 40. The pre-distortion can be achieved by modifying the voltage level of the respective control application signals $S_{H+}$, $S_{H-}$, $S_{L+}$, $S_{L-}$. The voltage level is adapted as a function of the time following a change of state of the respective control application signal $S_{H+}$, $S_{H-}$, $S_{L+}$, $S_{L-}$.

Transistors 141 to 144 of FIG. 8 and FIG. 9 are not driven hard into saturation, but rather controlled linearly so that a level having a defined internal resistance can be established for both terminals C_L and C_H and thus for bus wires 41, 42 of bus line 40. Control application signals $S_{H+}$ and $S_{H-}$ are established for terminal C_H and thus for bus wire 41. Asymmetrically with respect thereto, control application signals $S_{L+}$ and $S_{L-}$ are established for terminal C_L and thus for bus wire 42. In order to compensate for dynamic effects such as charge reversal processes, within each bit state (in other words, in the region of a symbol duration) specific control application functions (in other words, time profiles) for the control application signals $S_{H+}$, $S_{H-}$, $S_{L+}$, $S_{L-}$ are used in order to pre-distort the signal to be transmitted and the impedance of transmitter output stage 150.

As an application example, the desired level can be reached as quickly as possible as a result; this offers advantages especially for the transition from dominant to recessive states in the data section of CAN-FD.

Figure 10:
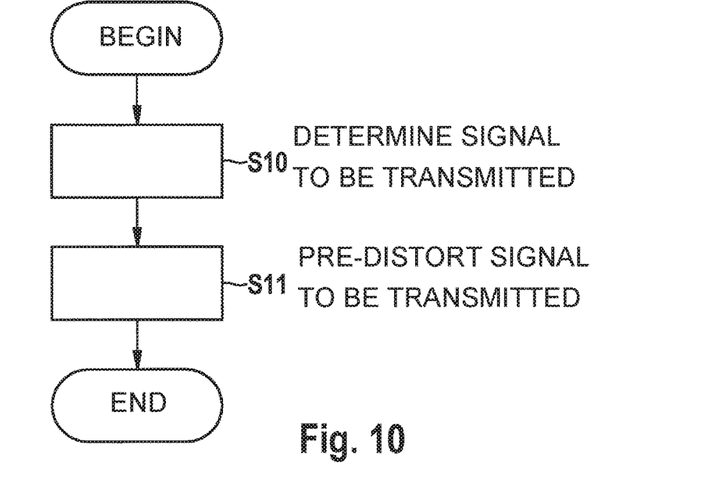
FIG. 10 is a flow chart of a method according to the second exemplifying embodiment.

FIG. 10 shows a method, associated therewith, for improving the error tolerance of a subscriber station 50, 60. Here, after the method begins in a step S10, the signal to be transmitted by transmission path 131 is determined.

In a subsequent step S11, the signal to be transmitted is pre-distorted by way of transmitter output stage 150 by the fact that the voltage levels of the respective control application signals $S_{H+}$, $S_{H-}$, $S_{L+}$, $S_{L-}$ are modified. The method then ends.

Figure 11:
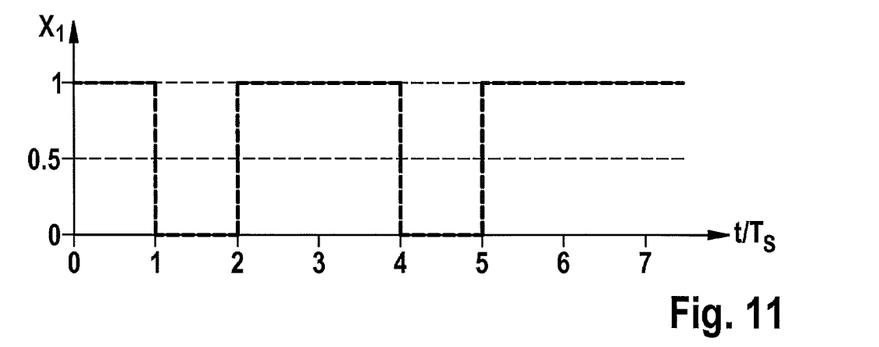
FIG. 11 shows an example of a control application signal for the transmitter output stage according to the second exemplifying embodiment.
Figure 12:
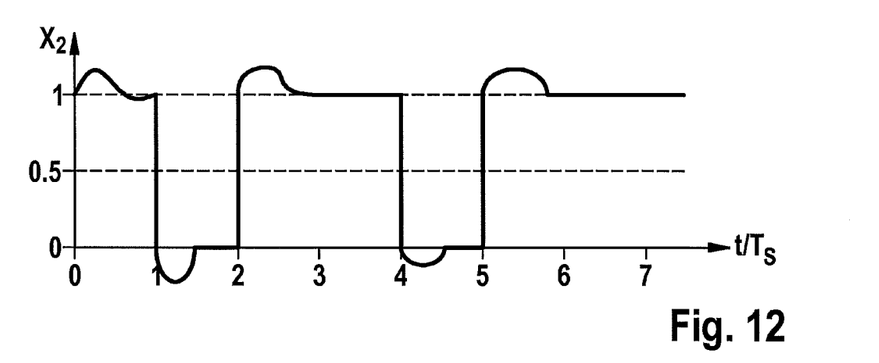
FIG. 12 shows an example of a pre-distorted control application signal for the transmitter output stage according to the second exemplifying embodiment.

FIG. 11 shows an example of a control application signal $X_1$ that has been pre-distorted for the control application signal $X_2$ shown in FIG. 12. In the case of the control application signal $X_2$ in FIG. 12, the shape depicted for the overshoots of the voltage level at the respective change of state of the voltage levels of the signal is only a specific example. In particular, the amplitude of the overshoots can also have the same magnitude in each case.

Figure 13:
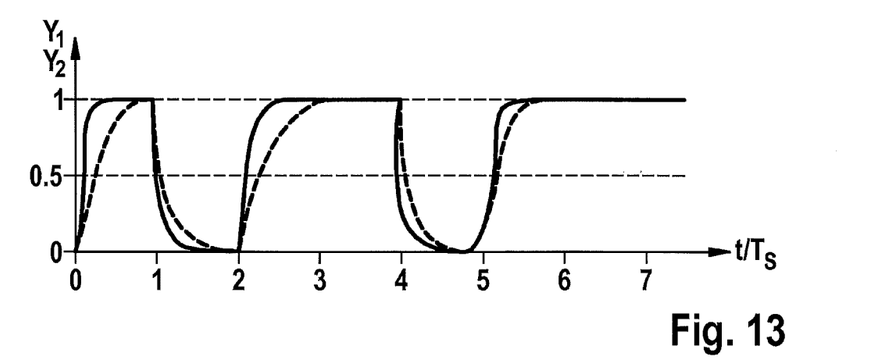
FIG. 13 shows a profile of the output signals of the transmitter output stage according to the second exemplifying embodiment for the signals of FIG. 11 and FIG. 12.

Alternatively or additionally, the time profile of at least one, or all, of the overshoots can take the shape of a sinusoidal curve, in particular a curve of identical shape for all the overshoots. The output signals $Y_1$, $Y_2$ of transmitter output stage 150 which result respectively therefrom are shown in FIG. 13. In FIG. 13 the signal drawn with a dashed line denotes the output signal $Y_1$ that is produced as a result of the control application signal of FIG. 11. The signal drawn with a solid line in FIG. 13 denotes the output signal $Y_2$ that is produced as a result of the control application signal of FIG. 12. It follows therefrom that the levels are established earlier with the output signal $Y_2$, which results from a pre-distortion with transmitter output stage 150, than with the un-pre-distorted signal.

Alternatively or additionally, the pre-distortion in step S11 can be accomplished by modification of the output resistance of transmission/reception device 13. The output resistance is also adapted as a function of the time following a change of state.

The method according to the present exemplifying embodiment, with its two alternatives, is particularly suitable for the transition from dominant to recessive states. This applies both to a CAN bus system and to FlexRay. The method is furthermore especially suitable for the problem at higher switching speeds in the data section of CAN-FD.

The present exemplifying embodiment is simpler than the first exemplifying embodiment for achieving an optimum error tolerance, since transmission path 131 has a more critical influence on the problem to be solved.

According to a third exemplifying embodiment, a pre-distortion according to the second exemplifying embodiment is performed. The bus system according to the third exemplifying embodiment is thus constructed in large part in the same manner as the bus system according to the second exemplifying embodiment.

In the present exemplifying embodiment, however, the transmitter properties of transmission/reception device 13 are adapted, as a function of the portion of a message 45, 46, 47 which is also called a CAN frame, in order to improve the switching edges.

Figure 14:
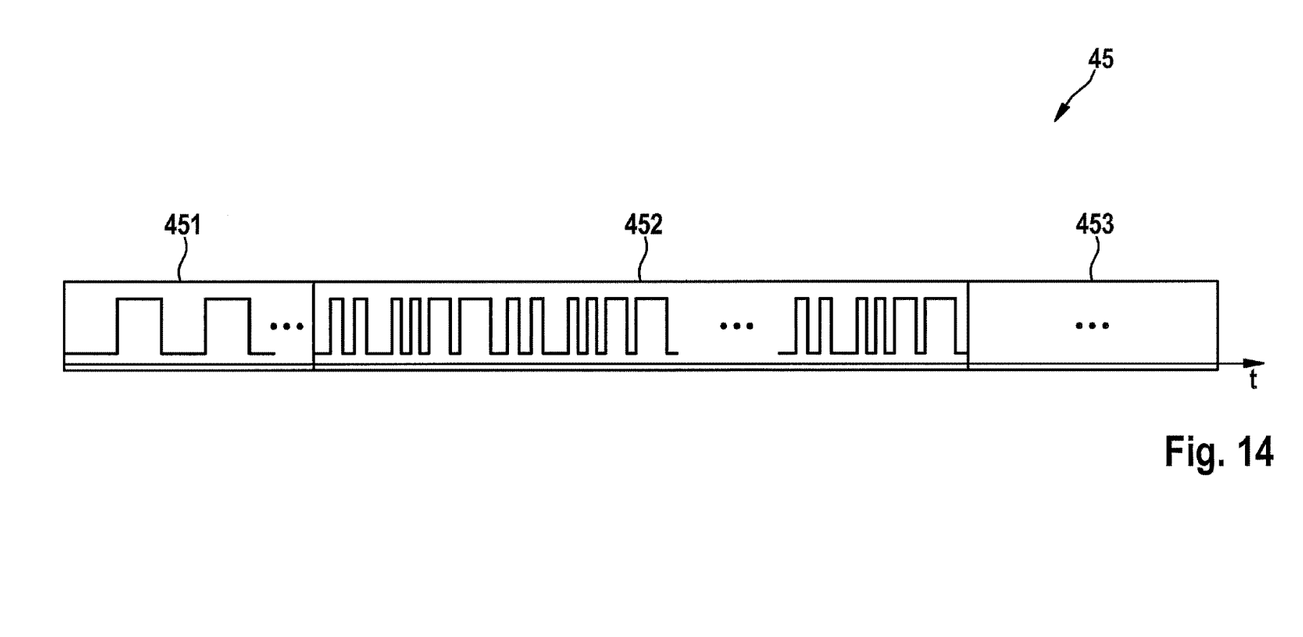
FIG. 14 shows an example of the structure of a message transmitted via the bus system.

FIG. 14 shows message 45 as an example of a CAN frame. Message 45 has a message header 451, a data portion 452, and a message end 453. Message header 451 and message end 453 serve for arbitration in a CAN bus system. Data portion 452 encompasses the data that are intended for operation of the respective subscriber station 10, 20, 50, 60.

In the present exemplifying embodiment, in step S11 the transmitter properties of transmission/reception device 13 are adapted only with respect to data portion 452. The transmitter properties of transmission/reception device 13 remain unchanged, however, with respect to message header 451 and message end 453.

The capability for arbitration in the context of message header 451 and message end 453 is thereby retained, and the quality of the signal on the bus line, especially in the data portion at higher cycle times, is improved. At the same time, the capability for transferring an error burst by corresponding configuration can be retained.

A pre-distortion according to the second exemplifying embodiment is likewise performed according to a fourth exemplifying embodiment. The bus system according to the fourth exemplifying embodiment is therefore constructed in large part in the same manner as the bus system according to the second exemplifying embodiment.

With the present exemplifying embodiment, however, the pre-distortion of the control application signals $S_{H+}$, $S_{H-}$, $S_{L+}$, $S_{L-}$ is used not only for pre-distortion of the transmission signal but also for dynamic adaptation of the impedance of transmitter output stage 150.

All the above-described embodiments of bus system 1, 2, of subscriber stations 10, 20, 30, 50, 60, and of the method according to the first to fourth exemplifying embodiments can be utilized individually or in all possible combinations. The following modifications in particular are additionally conceivable.

Bus system 1, 2 described previously, according to the first to fourth exemplifying embodiments, is described with reference to a bus system based on the CAN protocol. Bus system 1, 2 according to the first to fourth exemplifying embodiments can, however, also be a different type of communication network. It is advantageous, but not an obligatory prerequisite, that exclusive, collision-free access by a subscriber station 10, 20, 30, 50, 60 to bus line 40, or to a shared channel of bus line 40, is guaranteed in the context of bus system 1, 2 at least for certain time spans.

Bus system 1, 2 according to the first to fourth exemplifying embodiments is, in particular, a CAN network or a CAN-FD network or a LIN network or a FlexRay network.

The number and disposition of subscriber stations 10, 20, 30, 50, 60 in bus systems 1, 2 according to the first to fourth exemplifying embodiments is arbitrary. In particular, only subscriber stations 10 or subscriber stations 50 or subscriber stations 60 can also be present in bus systems 1, 2 of the first to fourth exemplifying embodiments.

The method can be optimized separately for each specific application, for example CAN-FD, FlexRay, etc. For multiple areas of application, the application can also be automatically detected and correspondingly adapted. For example, the method according to the first exemplifying embodiment is faster to execute with CAN-FD than with CAN, so that no delay which is longer than what is tolerated by the respective protocol occurs.

Subscriber stations 10, 30, 50, 60 represent, particularly for CAN-FD, a capability for raising the reception quality of CAN-FD into the range of usual CAN transfers while using a considerably higher data rate.

The functionality of the above-described exemplifying embodiments can be implemented (with reference to the first to fourth exemplifying embodiments) in a transceiver or a transmission/reception device 13, and (with reference to the first exemplifying embodiment) also in a communication control device 61, etc. Additionally or alternatively, it can be integrated into existing products.

What is claimed is:

1. A subscriber station for a bus system, comprising:
a transmission/reception device for transmitting a signal via the bus system to a further subscriber station and for receiving a signal via the bus system, in which exclusive, collision-free access by the subscriber station to a bus line of the bus system is guaranteed at least at times; and
a modification device for modifying at least one of transmission properties of a transmission path of the transmission/reception device and/or reception properties of a reception path of the transmission/reception device;
wherein an output resistance of the transmission/reception device depends on a transmission state of the signal that is to be transmitted or that has been transmitted, and
wherein the modification device includes at least one of:
a transmitter output stage for pre-distortion of the signal to be transmitted by the transmission/reception device, to achieve equilibration of a bus level on a transmission channel within one cycle of the signal to be transmitted, and
a receiver modification device to increase a detection point in time to the right in an eye diagram and increase a decider threshold upward in the eye diagram,
wherein the transmitter output stage includes:
a first transistor that is controllable by a first control application signal,
a second transistor that is controllable by a second control application signal,
wherein the first transistor is connected to a first bus terminal for a first bus wire of the bus line, and
wherein the second transistor is connected to a second bus terminal for a second bus wire of the bus line,
wherein one of the first control application signal and the second control application signal includes a high positive signal and the other one of the first control application signal and the second control application signal includes a low negative signal,
wherein the transmitter output stage further includes:
a third transistor that is controllable by a third control application signal, and
a fourth transistor that is controllable by a fourth control application signal,
wherein the third transistor is connected to the second bus terminal for the second bus wire of the bus line,
wherein the fourth transistor is connected to the first bus terminal for the first bus wire of the bus line,
wherein one signal set includes the first control application signal and the third control application signal, and another signal set includes the second control application signal and the fourth control application signal, wherein the one signal set includes a high positive signal and a low positive signal and the another signal set includes a high negative signal and a low negative signal, and
wherein the transistors providing the high positive signal and the low positive signal are in series, and wherein the transistors providing the high negative signal and the low negative signal are in series.

2. The subscriber station as recited in claim 1, wherein:
the transmitter output stage is configured, for pre-distortion of the signal to be transmitted by the transmission/reception device, so that the transmitter output stage adapts the transmitter properties of the subscriber station as a function of a portion of a frame of the bus system.

3. The subscriber station as recited in claim 2, wherein the transmitter output stage is configured for pre-distortion of a data portion of the signal to be transmitted by the transmission/reception device.

4. The subscriber station as recited in claim 1, wherein the transmitter output stage is configured, for pre-distortion of the signal to be transmitted by the transmission/reception device, so that the transmitter output stage modifies one of a voltage level of the signal to be transmitted and an output resistance of the transmission/reception device.

5. The subscriber station as recited in claim 4, wherein:
the transmitter output stage is configured so that the transmitter output stage adapts the voltage level and the output resistance as a function of a time following a change in a state of the transmission signal, and
the change in the state of the transmission signal includes a change from a dominant to a recessive state of the transmission signal.

6. The subscriber station as recited in claim 1, wherein the transmitter output stage is configured so that at least one of the following is satisfied:
the transmitter output stage respectively applies control linearly to the first to fourth transistors, to establish for the first and the second bus wires a level having a defined internal resistance, and
the transmitter output stage uses, within each bit state, predetermined time profiles for the first to fourth control application signals to pre-distort the signal to be transmitted and an impedance of the transmission path of the transmission/reception device.

7. A bus system, comprising:
a bus line; and
at least two subscriber stations that are connected to one another via the bus line so that the subscriber stations can communicate with one another,
at least one of the at least two subscriber stations including:
a transmission/reception device for transmitting a signal via the bus system to a further subscriber station and for receiving a signal via the bus system, in which exclusive, collision-free access by the at least one of the subscriber stations to a bus line of the bus system is guaranteed at least at times, and
a modification device for modifying at least one of transmission properties of a transmission path of the transmission/reception device and/or reception properties of a reception path of the transmission/reception device;
wherein an output resistance of the transmission/reception device depends on a transmission state of the signal that is to be transmitted or that has been transmitted, and
wherein the modification device includes at least one of:
a transmitter output stage for pre-distortion of the signal to be transmitted by the transmission/reception device, to achieve equilibration of a bus level on a transmission channel within one cycle of the signal to be transmitted, and
a receiver modification device to increase a detection point in time to the right in an eye diagram and increase a decider threshold upward in the eye diagram,
wherein the transmitter output stage includes:

a first transistor that is controllable by a first control application signal,
a second transistor that is controllable by a second control application signal,
wherein the first transistor is connected to a first bus terminal for a first bus wire of the bus line, and
wherein the second transistor is connected to a second bus terminal for a second bus wire of the bus line,
wherein one of the first control application signal and the second control application signal includes a high signal and the other one of the first control application signal and the second control application signal includes a low signal,
wherein the transmitter output stage further includes:
a third transistor that is controllable by a third control application signal, and
a fourth transistor that is controllable by a fourth control application signal,
wherein the third transistor is connected to the second bus terminal for the second bus wire of the bus line,
wherein the fourth transistor is connected to the first bus terminal for the first bus wire of the bus line,
wherein one signal set includes the first control application signal and the third control application signal, and another signal set includes the second control application signal and the fourth control application signal, wherein the one signal set includes a high positive signal and a low positive signal and the another signal set includes a high negative signal and a low negative signal, and
wherein the transistors providing the high positive signal and the low positive signal are in series, and wherein the transistors providing the high negative signal and the low negative signal are in series.

8. A method for improving an error tolerance of a subscriber station of a bus system, comprising:
performing one of:
transmitting, with a transmission/reception device of the subscriber station, a signal via the bus system to a further subscriber station, and
receiving, with the transmission/reception device of the subscriber station, a signal via the bus system, in which exclusive, collision-free access by the subscriber station to a bus line of the bus system is guaranteed at least at times; and
modifying, with a modification device of the subscriber station, at least one of transmission properties of a transmission path of the transmission/reception device and reception properties of a reception path of the transmission/reception device;
wherein an output resistance of the transmission/reception device depends on a transmission state of the signal that is to be transmitted or that has been transmitted, and
wherein the modification device includes at least one of:
a transmitter output stage for pre-distortion of the signal to be transmitted by the transmission/reception device, to achieve equilibration of a bus level on a transmission channel within one cycle of the signal to be transmitted, and
a receiver modification device to increase a detection point in time to the right in an eye diagram and increase a decider threshold upward in the eye diagram,
wherein the transmitter output stage includes:

a first transistor that is controllable by a first control application signal, a second transistor that is controllable by a second control application signal, wherein the first transistor is connected to a first bus terminal for a first bus wire of the bus line, and wherein the second transistor is connected to a second bus terminal for a second bus wire of the bus line, wherein one of the first control application signal and the second control application signal includes a high signal and the other one of the first control application signal and the second control application signal includes a low signal, wherein the transmitter output stage further includes:

a third transistor that is controllable by a third control application signal, and a fourth transistor that is controllable by a fourth control application signal, wherein the third transistor is connected to the second bus terminal for the second bus wire of the bus line, wherein the fourth transistor is connected to the first bus terminal for the first bus wire of the bus line, wherein one signal set includes the first control application signal and the third control application signal, and another signal set includes the second control application signal and the fourth control application signal, wherein the one signal set includes a high positive signal and a low positive signal and the another signal set includes a high negative signal and a low negative signal, and wherein the transistors providing the high positive signal and the low positive signal are in series, and wherein the transistors providing the high negative signal and the low negative signal are in series.

* * * * *